3,632,771
Patented Jan. 4, 1972

3,632,771
METHOD AND COMPOSITION FOR COMBATTING FUNGICIDAL INFECTIONS
Hendrik Dolman and Albert Tempel, van Houtenlaan, Netherlands, assignors to U.S. Philips Corporation, New York, N.Y.
No Drawing. Continuation-in-part of application Ser. No. 661,797, Aug. 21, 1967. This application Apr. 24, 1970, Ser. No. 31,761
Claims priority, application Netherlands, Aug. 19, 1966, 6611689
Int. Cl. A61j 3/04
U.S. Cl. 424—302     8 Claims

ABSTRACT OF THE DISCLOSURE

Composition and method of treating fungus skin infections with aromatic sulfonyl or sulfoxyl alkylene-rhodanides. An example is 2,4,5-trichlorophenyl rhodane methyl sulfone.

---

This application is a continuation-in-part of our copending application Ser. No. 661,797, filed Aug. 21, 1967 now abandoned.

In our parent application Ser. No. 661,797, we have disclosed various aromatic substituted sulfonyl and sulfoxyl alkylene rhodanides and their use in combatting fungus infections in plants and animals.

The instant application is directed to methods and compositions for combatting fungus infections in warm-blood animals.

It is the object of the instant invention to provide an effective composition and method for combatting fungus infections in warm-blooded animals.

According to the instant invention, it has been found that chlorinated phenyl sulfonyl or sulfoxy methylene rhodanes of the formula

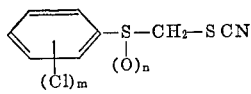

wherein $m$ is an integer from 1 to 5 and $n$ is an integer from 1 to 2, are useful in combatting fungus infections in warm-blooded animals.

These compounds have been found to be useful in combatting fungus skin infections in warm-blooded animals for example infections due to *Candida albicans* microsporum and *Trichophyton mentagrophytes*.

In particular, it has been found that the compounds of the following formulae are effective in treating skin-infections in warm-blooded animals caused by fungi:

DU 13,153 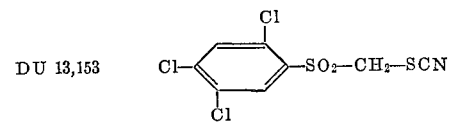

DU 11,587 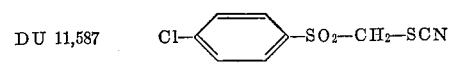

DU 13,743 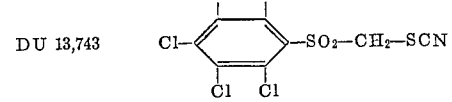

DU 13,582 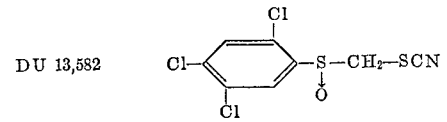

DU 14,638 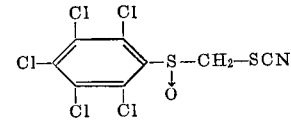

and

DU 15,292 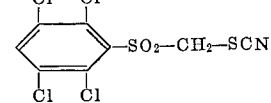

The rhodanide compounds of the instant invention may be prepared according to the methods given in the aforementioned parent application, pages 7 to 19 of which are hereby specifically incorporated by reference.

The active rhodanide compounds of the instant invention may be applied to the infected area of the skin in the form of creams, ointments, lotions, powders, aerosol sprays or other vehicles known in the pharmaceutical art.

Usually a concentration of the active rhodanide compound of about ½ to 5% is employed. However, lower or higher concentrations may be employed according to the type and intensity of infection and other factors determinable by a person skilled in the veterinary or medical fields. In general, the rhodanide is applied to the affected area of the skin for about one to three weeks.

Lotions may be formulated with aqueous or oily bases and may include one or more emulsifying agents, wetting agents, dispersing agents and carrier agents including esters of glycerol, esters of glycol, esters of polyene, esters of propane glycol, vegetable oils such as castor oil, mineral oils, dimethyl acetamide, dimethyl formamide, dimethyl sulfoxide and mixtures of water and alcohol etc.

Creams may be prepared with such carriers as lanolin, mineral oil, cetyl alcohol, stearyl alcohol etc.

Powders may be prepared with any suitable powder base, for example starch, talc, lactose, calcium carbonate etc.

The invention will now be described in greater detail with reference to the following examples:

(I) A lotion was prepared from the following ingredients employing known pharmaceutical techniques:

|  | Parts |
|---|---|
| 2,4,5-trichlorophenyl sulfonyl methylene rhodane | 5 |
| Ethanol (85%) | 70 |
| Salicylic acid | 3 |
| Methyl salicylate | 5 |
| Glycol | 10 |

(II) An ointment was prepared from the following ingredients employing known pharmaceutical techniques:

|  | Parts |
|---|---|
| Pentachlorophenyl sulfonyl methylene rhodane | 3 |
| Octadecyl alcohol | 2 |
| White petrolatum | 90 |
| Lanolin | 5 |

(III) A cream was prepared from the following ingredients employing known pharmaceutical techniques:

|  | Parts |
|---|---|
| Pentachlorophenylsulfoxyl methylene rhodane | 2 |
| Mineral oil | 7 |
| Lanolin | 18 |
| Cetyl alcohol | 3 |
| Beeswax | 10 |
| Petrolatum | 10 |

(IV) A dusting powder was prepared by grinding together and mixing together the following ingredients:

|  | Parts |
|---|---|
| Parachlorophenyl sulfonyl methylene rhodane | 4 |
| Talc | 96 |

IN VIVO TESTS (A) *Miscrosporum canis* infection in guinea pigs

Four groups of five guinea pigs each were shaved, scarified with a scalpel blade and then had a cultural suspension of *Microsporum canis* rubbed in the scarified areas.

From the first day through the twenty first day after the guinea pigs were thus infected to the infected areas of one group of guinea pigs there was applied a cream containing in a cream base of 1 part of almond oil, 1 part of lanolin and 1 part of lime water 2% of Du 13,153 (2,4,5-trichlorophenyl sulfonyl methylene rhodane). A second group of similarly infected guinea pigs were treated in the same manner with the cream containing 4% of the Du 13,153. A third group of similarly infected guinea pigs was treated with the cream base containing no Du 13,153. A fourth group of similarly infected guinea pigs was not treated.

The degree of infection was determined at the seventh, fourteenth and twenty first day after infection by visual inspection and by making cultures in selective Sabouranel's agar from the infected sites.

It was found that both the group of guinea pigs that was untreated and the group of guinea pigs treated only with the cream base showed heavy infections. The groups of guinea pigs treated with the cream containing 2% of Du 13,153 and the group of guinea pigs treated with the cream containing 4% of Du 13,153 showed little or no signs of infection.

What we claim is:

1. A method of combatting fungi infections on the skin of a warm-blooded animal, said method comprising applying to the infected skin area of said animal a topical preparation suitable for application to a skin of a warm-blooded animal to combat fungi infections said preparation comprising an effective topical fungi infection combatting amount of an alkylene rhodanide selected from the group consisting of

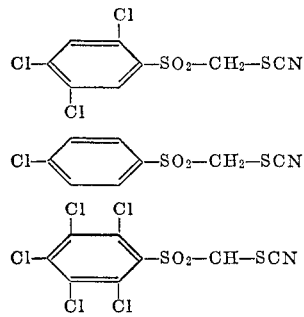

and

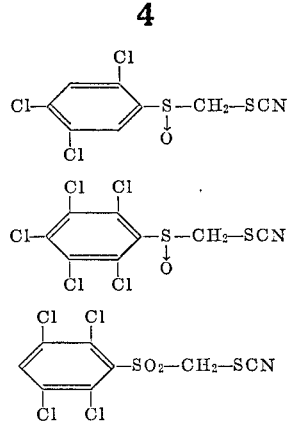

and a finely divided pharmaceutical acceptable topical carrier therefor.

2. The method of claim 1 wherin from about ½ to 5% by weight of the alkylene rhodanide is present.

3. The method of claim 2 wherein the carrier is a liquid.

4. The method of claim 2 wherein the carrier is a solid.

5. The method of claim 2 wherein the aklylene rhodanide is 2,4,5-trichlorophenyl sulfonyl methylene rhodane.

6. The method of claim 1 wherein the preparation is applied for a period of from about one to three weeks.

7. The method of claim 1 wherein the fungus is *Candida albicans* microsporum or *Trichophyton mentagrophytes*.

8. The method of claim 1 wherein the alkylene rhodanide is 2,4,5-trichlorophenyl sulfonyl methylene rhodane.

References Cited

UNITED STATES PATENTS

| | | | |
|---|---|---|---|
| 3,222,248 | 12/1965 | Lukes et al. | 424—302 |
| 3,097,130 | 7/1963 | Regez et al. | 424—302 |
| 2,824,887 | 2/1958 | Klopping | 260—454 |
| 2,802,769 | 8/1957 | Van Stryk et al. | 424—302 |
| 2,785,190 | 3/1957 | Klopping | 260—454 |

FOREIGN PATENTS

| | | | |
|---|---|---|---|
| 1,219,924 | 6/1966 | Germany | 260—454 |

OTHER REFERENCES

Goerdeler et al., Tetrahedron Letters 48: 3665–6 (10/64). Burger, Medicinal Chemistry, Interscience, N.Y. 1960 p. 74.

SHEP K. ROSE, Primary Examiner

U.S. Cl. X.R.

260—397.6, 454